Sept. 29, 1942.　　　H. F. TÖNNIES　　　2,297,262
PHOTOGRAPHIC APPARATUS
Filed Dec. 8, 1938
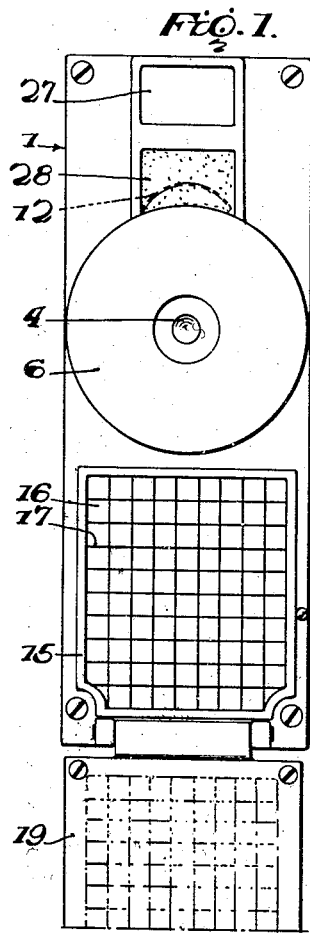
FIG. 1.
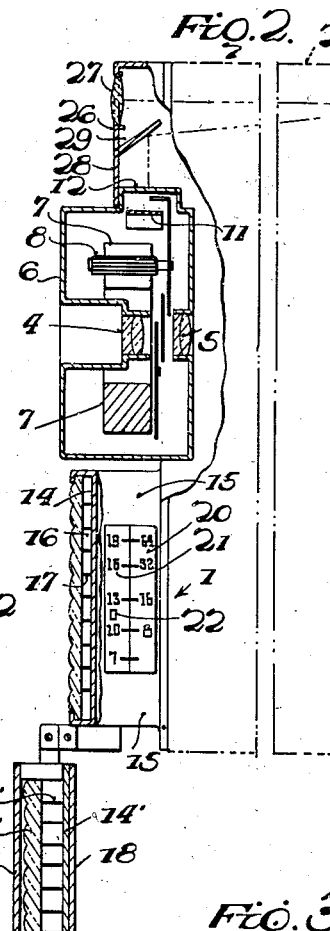
FIG. 2.
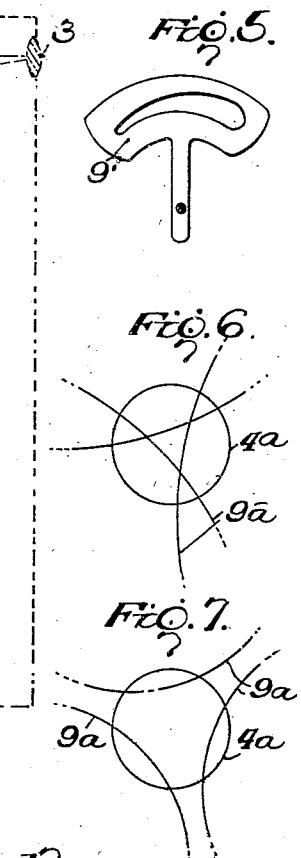
FIG. 5.
FIG. 6.
FIG. 7.
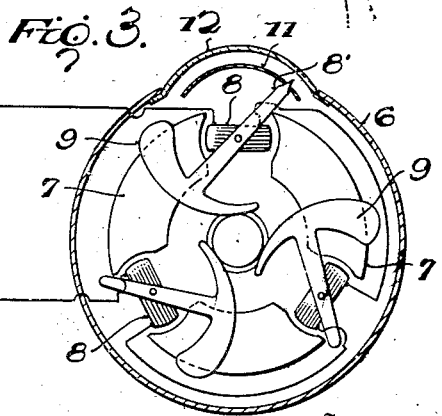
FIG. 3.
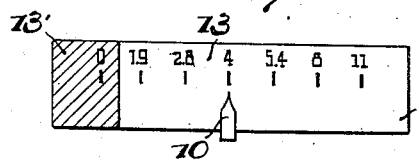
FIG. 4.
Inventor
Hans Ferdinand Tönnies,
By Potter, Pierce & Scheffler,
Attorneys.

UNITED STATES PATENT OFFICE 2,297,262

PHOTOGRAPHIC APPARATUS

Hans Ferdinand Tönnies, Hamburg-Grossflottbek, Germany; vested in the Alien Property Custodian Application December 8, 1938, Serial No. 244,703
In Germany January 19, 1938

5 Claims. (Cl. 95—64)

This invention relates to photographic apparatus and particularly to a camera having photoelectric means for automatically adjusting the camera lens diaphragm in accordance with preselected exposure factors, for example, film speed and shutter timing, and the brightness of the scene to be photographed.

My prior patent, No. 2,051,061, granted August 18, 1936, describes a camera diaphragm and a photoelectric system for automatically adjusting the diaphragm in accordance with the brightness of the scene, and this prior apparatus provides the appropriate diaphragm opening for one preselected exposure time and one film speed. The present invention contemplates an automatically operated diaphragm and a photoelectric system which includes elements adjustable to control the operation of the diaphragm in accordance with the variable exposure factors of film speed and shutter timing. The invention will be described with reference to a motion picture camera in which the shutter timing is dependent upon the number of picture frames per second but it is to be understood that the invention is applicable to "still" cameras in which there is greater latitude in the selection of the exposure time.

An object of the invention is to provide photographic apparatus including camera diaphragm blades, an electrical instrument for adjusting the diaphragm blades, a photoelectric cell system, and devices adjustable to regulate the current flowing from said cell to said instrument in accordance with selected values of the exposure factors of film speed and shutter timing. An object is to provide a motion picture camera having a photoelectric system for automatically adjusting the camera diaphragm in accordance with the scene brightness, the film speed and the shutter timing, i. e. the number of picture frames per second. An object is to provide photographic apparatus comprising an assembly, in a single unit that may be bodily incorporated in a camera, a lens and diaphragm, a device adjustable to control the shutter timing, a photoelectric system for controlling the diaphragm, and apparatus for controlling the sensitivity of the photoelectric system in accordance with film speed and the setting of the shutter timing device. A further object is to provide a camera having a view finder, a lens diaphragm, an electrical instrument for actuating the diaphragm, and a photoelectric device for supplying current to said instrument, the instrument having a pointer and scale visible in the camera view finder, whereby the operator may ascertain while looking through the view finder whether or not the scene brightness is such as to afford a proper exposure at the selected shutter timing. A further object is to provide photographic apparatus including a plurality of pivoted diaphragm blades having edges approximating a parabola, an ellipse or a hyperbola drawn about the blade axis.

These and other objects and advantages of the invention will be apparent from the following specification when taken with the accompanying drawing in which:

Fig. 1 is a front elevation of an embodiment of the invention;

Fig. 2 is a side elevation of the same, with the motion picture camera case shown in dotted lines;

Fig. 3 is a vertical section through the automatic diaphragm with the associated electrical circuit shown diagrammatically;

Fig. 4 is a plan view of the instrument scale;

Fig. 5 is an elevation of a modified form of diaphragm blade; and

Figs. 6 and 7 are diagrams illustrating different diaphragm openings.

In the drawing, the reference numeral 1 identifies a plate that carries the entire exposure apparatus for assembly as a unit on the case 2 of a motion picture camera. The detailed construction of the shutter and film advancing mechanism is not a part of this invention and only the outline of case 2 and the location of the eye piece 3 of the view finder are indicated in Fig. 2. The axially spaced elements 4, 5 of the camera lens are mounted in a housing 6 that is arranged approximately at the center of the plate 2, and an electrical measuring instrument for adjusting the diaphragm opening includes the circumferentially spaced permanent magnet sections 7 and coils 8 pivotally mounted in the gaps between the magnet sections for movement about an axis parallel to the lens axis. The usual soft iron cores are mounted in the gaps between the magnet sections but are not illustrated in the drawings. Each coil carries a diaphragm blade 9 of mica or aluminum that is coated with a dull black enamel or paint.

Each diaphragm blade 9 has an outer light-intercepting edge that is tangent to the light passage at a single point in the fully open diaphragm position and is non-circular with respect to the blade axis to move radially inward into the light passage with increasing current flow through the associated coil 8. The outer blade edge may approximate a parabola, hyperbola or ellipse drawn about the axis of the associated coil, the particular curve form depending upon the desired variation of diaphragm opening with changing current flow from the photocell. The angular movement of the coils 8 may be of the order of from 80° to 90° to provide a gradual displacement of the blade edges towards and away from the axis of the camera lens. The blades may be quite small and of light weight, thus simplifying the balancing of the blades.

The counterbalance extension 8' of the upper blade carries a pointer extension 10 that moves over the scale plate 11 that is located beneath a window 12 in the upper part of the housing 6. The scale plate 11 has graduations 13 of diaphragm openings, for example f 1.9 to f 11, and the end 13' of the plate is of distinctive color, for example red, and has a mark "0" indicating the zero position of the pointer.

The photosensitive system comprises a cell 14 in a casing 15 at the lower portion of the plate 1. A multiple lens plate 16 and compartment plate 17 are positioned in front of the cell to limit the spread of the light rays that reach the cell. The area of cell 14 is preferably such that the current output to the automatic diaphragm adjusts the blades to a diaphragm opening appropriate for the least number of picture frames per second and the most rapid film that is commercially available. As will be explained later, mechanism is provided for reducing the current for lower film speed and/or for more frames per second. An additional, but normally inactive, cell 14' may be mounted on the cover plate 18 of the casing 15 to adapt the apparatus for use with films of higher speed that may be developed in the future. The cell 14' has a lens plate 16' and compartment baffle 17' for limiting its acceptance angle, and it is covered by an opaque plate 19 that is to be removed if a new film of twice the present maximum speed is available at a later date.

A scale 20 of frames per second is mounted or marked on the photocell casing 15 and graduated in the usual values of 8, 16, 32 and 64. A plate 21 bearing graduations of film speeds, for example in Din degrees of from 7 to 19 is movable by a handle or knob 22 along the scale 20 to modulate the current output of the photocell by one of the known optical or electrical "current chokes" such, for example, as are described in my copending application Ser. No. 244,858, filed Dec. 9, 1938, "Photoelectric apparatus for cameras." When the current choke is of the electrical type, the plate 21 moves a contact 24 along a resistor 25, or along switch points connected to the resistor, Fig. 3. One terminal of the resistor is connected to the photocell 14 and the instrument coils 8 are connected in series between the slide 21 and the other photocell terminal. The adjustment of the slide 21 to aline the selected number of exposures per second with the selected film speed thus varies the circuit resistance to throttle the current flow for any given scene brightness to a greater or lesser extent in accordance with the selected film speed and shutter timing.

The extent to which the diaphragm blades are closed, or the fact that the light is not sufficient for an adequate exposure, may be observed continuously by means of an optical system which produces an image of the pointer 10 and scale 11 in the view finder.

The position of the pointer 10 on the scale plate 11 indicates the diaphragm value and an optical system is provided to produce an image of the scale and pointer in the camera view finder. The lower end of a housing 26 which carries the objective lens 27 of the view finder fits over the curved window 12 of the lens housing 6 and has a translucent or ground glass plate 28 which admits light to the scale plate 11. A mirror 29 is positioned in the housing 26 and above the translucent wall section 28 to reflect an image of the scale and pointer towards the view finder eye piece 3. The image of the instrument scale is superposed over the view and the operator can thus determine whether the diaphragm opening indicated by the pointer 10 affords the desired or necessary depth of focus.

The diaphragm blades 9', Fig. 5, extend over the lens system and have flared openings with inner edges that clear the lens systems and outer edges of approximately parabolic, elliptical or hyperbolic shape for progressively obstructing the light passage with increasing current flow through the instrument.

A camera having a fully automatic diaphragm embodying the invention is employed in the following manner. The current throttle element, slide 21, is adjusted to aline the film speed and the frames per second graduations, and the camera control of frames per second is also set at the selected value. No further adjustments of these control members is necessary until a film of different speed or a different rate of frame speed is desired. The camera is directed towards the scene to be photographed, and the diaphragm blades 9 are automatically adjusted by the current output of the cell 14.

Assuming the normal frame speed of 16 per second and a film speed of 16° Din, the slide 21 will be positioned as shown in Fig. 3. These selected values may result in the pointer position of Fig. 4 for a particular average brightness of the scene. Adjustment of slide 21 in accordance with a lower film speed and the same frame speed, or for the same film and more frames per second, will introduce more resistance into the circuit, thus reducing the current flow to move the blades 9 clockwise for a larger diaphragm opening. The shutter timing is reduced by 50% when the number of frames is doubled, and the successive Din values are related in the same ratio, i. e. a film of 16° Din has one-half the speed of a film of 19° Din. A change of either shutter speed or film speed to the next lower value thus requires a current reduction which effects a 100% increase in the size of the diaphragm opening.

Typical patterns of the diaphragm opening afforded by the blades 9 are shown diagrammatically in Figs. 6 and 7; the circle 4a indicating the light passage through the lens system and the lines 9a indicating the outer edges of the blades 9 or the outer edges of the openings of blades 9'.

It will be apparent that the automatic or electrical diaphragm, the photoelectric system and the current chokes may be constructed as units that are separately assembled on the camera case, but the described mounting of the entire photoelectric apparatus on a single plate permits inspection and calibration of these highly sensitive camera parts before they are assembled with the other elements and the case of a camera. The forces available for actuation of the diaphragm blades are minute and the construction and adjustment of the photoelectric apparatus call for skill of a substantially higher order than that required for the assembly of the shutter, spring motor and other parts of a motion picture camera. In the case of a still camera, the shutter may also be included, in the assembly on plate 1, or a focal plane shutter may be used.

The range of adjustment for shutter timing is restricted in motion picture cameras and the invention has been described, for simplicity, as embodied in such a camera. It will be apparent that the invention may be applied to still cameras having shutters that may be set for a wide range of shutter timing.

I claim:

1. Photoelectric apparatus for use with the lens of a camera, said apparatus comprising a plurality of diaphragm blades, means pivotally supporting said blades for movement in planes normal to the axis of the lens, and electrical instrument means for actuating said blades; each of said blades having a single light-intercepting edge located outside of and tangent to the light passage through said lens in the fully open diaphragm position, the curvature of the blade edge being non-circular with respect to the blade axis to move radially into the light passage with increasing current flow through said electrical instrument means.

2. An electrically operated lens diaphragm comprising a lens housing, a magnetic system substantially coaxial with said housing and comprising at least three circumferentially spaced permanent magnet sections, a pivoted coil in each gap of said magnetic system, and diaphragm blades mounted on each coil; each blade having an opening therethrough with an inner edge concentric to the axis of the associated coil and an outer light-intercepting edge flaring from said concentric inner edge to move radially inward toward the axis of the lens system upon angular movement of the blade, said outer edge being substantially tangent to the light passage through the lens system at a single point in the fully open diaphragm position.

3. Photoelectric exposure apparatus comprising a mounting plate, a diaphragm housing on said mounting plate and having a window at the periphery thereof, pivoted diaphragm blades and electrical means within said housing for actuating the same, a pointer movable by said electrical means beneath said window, a graduated scale of diaphragm openings cooperating with said pointer, a view finder comprising an objective lens carried by said mounting plate in spaced relation to said window and an eye piece, and a mirror supported on said mounting plate for reflecting an image of said scale and pointer to said eye piece and into the field of said view finder.

4. Photoelectric exposure apparatus as claimed in claim 3, wherein said mounting plate has a translucent front wall to admit light to said window and scale plate.

5. Photoelectric exposure determining apparatus for use with a motion picture camera, said apparatus comprising a mounting plate for assembly with the casing of the camera as the front wall thereof, an objective lens on said plate for cooperation with an eye piece on the rear wall of the camera casing to form a view finder, a lens housing on said plate, a lens system carried by said housing, a plurality of diaphragm blades for adjusting the effective light opening through said lens system, electrical instrument means within said housing for adjusting said diaphragm blades, photosensitive means mounted on said plate and connected to said electrical instrument means, means including a scale and a member operated by said electrical instrument means for indicating the adjustment of said diaphragm blades, and optical means mounted on said plate for forming an image of said indicating means in the field of said view finder, whereby the operator of the camera may continuously observe both the field of the camera lens and the means indicating the adjustment of the diaphragm blades during the taking of a motion picture.

HANS FERDINAND TÖNNIES.